Aug. 10, 1954  R. D. ARBOGAST  2,686,214
PRIMARY BATTERY
Filed June 5, 1951
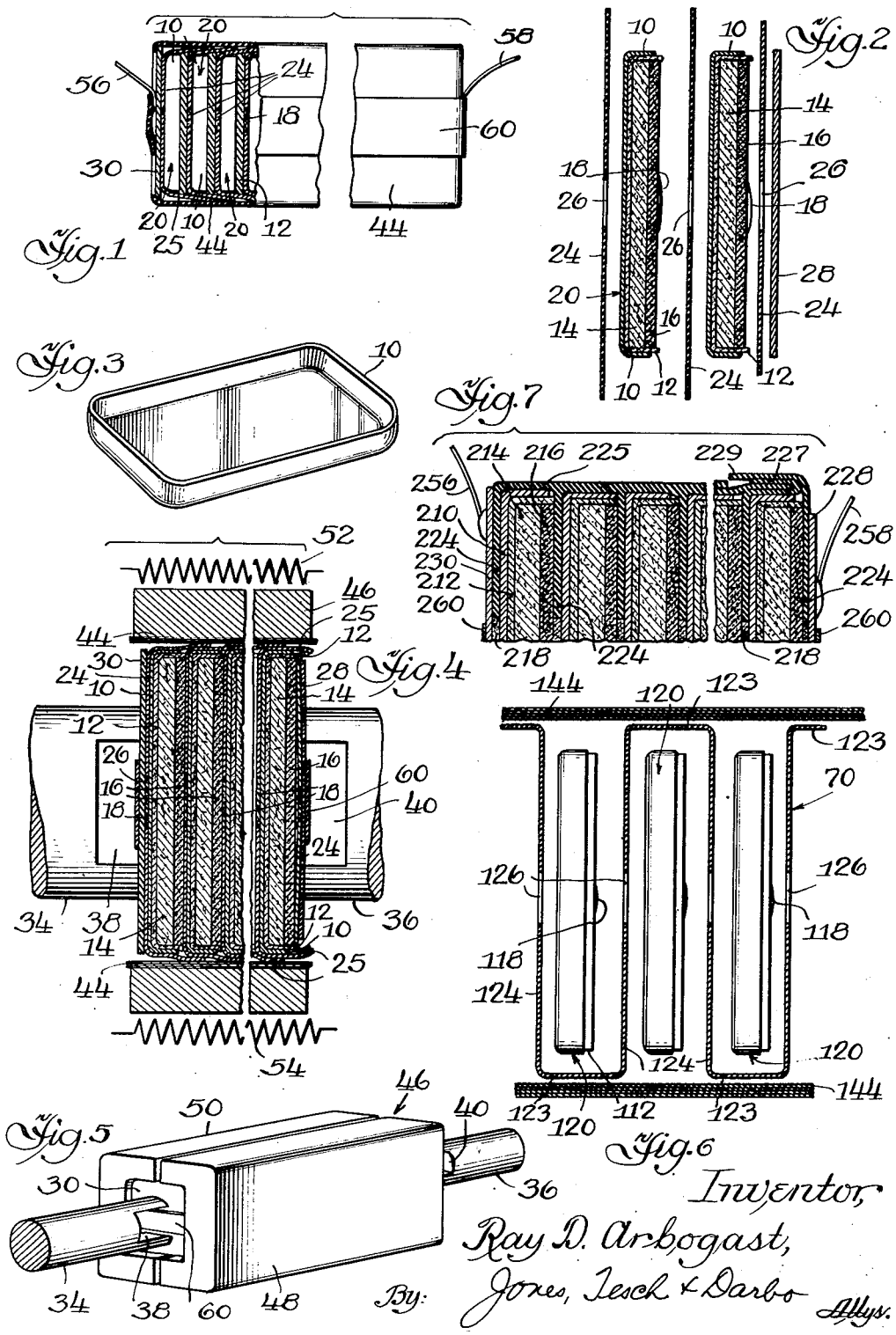
Inventor,
Ray D. Arbogast,
By: Jones, Tesch & Darbo Attys.

Patented Aug. 10, 1954

2,686,214

UNITED STATES PATENT OFFICE 2,686,214

PRIMARY BATTERY

Ray D. Arbogast, Freeport, Ill., assignor to Burgess Battery Company, Freeport, Ill., a corporation of Delaware Application June 5, 1951, Serial No. 230,014

14 Claims. (Cl. 136—111)

This invention relates to primary batteries and particularly to primary batteries of the flat type which are made up of a plurality of cells composed of flat elements, and to the method of making the battery. The invention relates particularly to the provision of an enclosure for a battery of the character described having a sealed compartment for each cell.

Batteries of flat type are often of small size and it is important to provide an economical but strong enclosure. Also, for successful performance it is essential that the electrolyte-containing element or elements of each cell be isolated from those of the others. The present invention is directed to the provision of a simple and economical structure for flat batteries which provides a strong enclosure having a sealed compartment for each cell, thereby isolating the electrolyte-containing elements of each cell. The present invention also provides a simple and economical method of making a battery of the character described.

In the flat batteries which are known, the provision of the enclosure and the isolation of the electrolyte-containing elements of each cell are accomplished in various ways. In the usual construction, a multiplicity of thin, flat cell elements are stacked together in pressure contact with each other and suitably arranged to form the cells of the battery, with the negative electrode of one cell adjacent to and in electrical connection with the positive electrode of the next cell. In one form of such battery, the stack of flat cell elements is held in pressure contact in a rigid container and a space within the container and around the lateral surfaces of the stack is filled with a fusible sealing composition which serves to isolate the electrolyte-containing elements of each cell.

In another form of battery, a group of elements including the electrolyte-containing elements of each cell, is enclosed at its periphery by an insulating integument which covers the edges and the peripheral margins of the group, and the groups are held together under pressure by a tape whereby the integuments form sealed joints and isolate the electrolyte-containing elements of each cell.

In another form of battery, a rigid non-conductive shell is provided for each cell, which shell nests into the open side of the shell of the adjacent cell in such a way as to isolate the electrolyte-containing elements of each cell. The nested shells form the container.

In another form, a stiff insulating plastic sheet-form separator is provided between each pair of adjacent cells, the separators project laterally beyond the boundaries of the cells, and an insulating gel lacquer or resin shell is formed between the edges of adjacent separators by dipping such edges into a bath of the gel or resin and rotating the battery. In this manner a casing is provided which forms an enclosure for each cell having an insulating gel or resin wall spaced from the edges of the electrolyte-containing elements.

In accordance with the present invention, the flat cells are arranged in a stack and a flexible, non-conductive, heat-fusible separator is arranged between each pair of adjacent cells, the separator having edge portions projecting beyond the edges of the cells. The projecting portions of the separators are turned or folded in a direction longitudinally of the stack and caused to rest against the edges of the cells to form peripheral encirclements upon the edges of the cells, and a thin strip of similar flexible, non-conductive, heat-fusible material is wound snugly laterally around the stack several times to form a multiple-layer transverse wrap which is in contact with the peripheral encirclements. The transverse wrap is then compressed against the lateral surfaces of the stack and the said encirclements, and the assembly is heated whereby the layers of the wrap are softened and fused together under pressure into a tightly fitting, single-layer shell, and the surfaces thereof are fused under pressure to the turned edge portions of the separators to form a strong, unitary housing or casing having an individual sealed compartment for each cell. The turned edge portions of one separator preferably partially overlap those of the adjacent separator and these overlapping portions are at the same time fused together under pressure. The result is a simple yet strong and rugged battery in which the electrolyte-containing elements of each cell are effectively isolated from those of the other cells.

In the drawing

Fig. 1 is an elevation, partly in section, of one embodiment of the battery of the invention, Fig. 2 is an exploded sectional view showing the relative arrangement of two cells of the battery and the separators which cooperate therewith, Fig. 3 is a perspective view of a tray-shaped negative electrode for the cells, Fig. 4 is a view, partly diagrammatic, illustrating the means and method for compressing the stack of cells and forming the tightly fitting transverse wrap, and joining the same to the separators, Fig. 5 is a perspective view illustrating the same apparatus, and Fig. 6 is a sectional view showing parts of a different embodiment of the battery, in which the separator is in the form of a continuous ribbon. The parts are shown spread apart so that they can be seen more clearly.

Fig. 7 is a sectional view of a portion of a different embodiment of the battery of the invention.

Referring to Figs. 2 and 3, each cell has a negative electrode 10 in the form of a shallow pan or tray and which may be composed of zinc or other suitable metal. In the specific embodiment shown the tray is of rectangular shape but it may be of other shape, such as circular, etc. In addition to serving as the negative electrode, the tray 10 serves as a container for other elements of the cell. The interior surface of the tray 10 is lined with a layer 12 of non-conductive, electrolyte-absorbent material, such as paper. Within the layer 12 is a mass or block of depolarizing mix 14, which may be composed of the usual compressed mixture of finely divided manganese dioxide and conductive carbon. The layer 12 and mix 14 are moistened with the electrolyte which may be the usual aqueous solution of ammonium chloride and zinc chloride. Resting against the surface of mix 14 is a plate or slab 16 of carbon which forms the positive electrode of the cell. As is shown in Fig. 2 the paper layer 12 is tray-shaped and the sides thereof preferably extend beyond the side of the metal tray 10 and completely cover the edges of the mix 14 and carbon electrode 16 to effectively separate the last mentioned elements from the zinc tray 10. The negative electrode 10 and positive electrode 16 form, respectively, the opposite exposed broad faces of the cell. Substantially centrally upon the exposed surface of the carbon electrode 16 is a spot or mass 18 of a conductive composition, which may be a conductive wax composition such as is described in the copending application of Sam Kurlandsky, Serial No. 161,892, filed May 13, 1950, and which is composed of finely divided silver particles, preferably precipitated silver particles, and a waxy binder-lubricant, which may be of microcrystalline wax, beeswax, paraffin, candelilla, montan or the like. The conductive composition 18 is applied to the carbon 16 by heating it sufficiently to soften it and then placing a small quantity upon the surface of the carbon electrode.

The described assembly forms the cell 20 and between each pair of adjacent cells 20 is located a separating sheet 24, composed of thin, flexible, non-conductive, heat-fusible impervious sheet material, which may be composed of rubber hydrochloride, a form of which is commercially available under the trade mark "Pliofilm," polymerized ethylene, the copolymer of vinyl acetate and vinyl chloride, or the like. The separator 24 is sandwiched between the positive electrode 16 of one cell and the negative electrode 10 of the adjacent cell. The separator is of a shape corresponding to that of the bottom of tray 10, which in the embodiment shown is rectangular, and is of a size such that the edge portions thereof extend beyond the edges of the cells 20. Each separator 24 has a substantially central opening 26 therein which registers with the localized mass of conductive composition 18.

In forming a battery, the desired number of the cells 20 are arranged in a stack substantially as is shown in Fig. 1 and metal conductive terminal plates 28 (see Fig. 2) and 30 (see Fig. 1) are arranged at the opposite ends of the stack. Terminal plate 30 has a conductive mass thereon similar to the masses 18 described heretofore. A separator 24 is arranged between the positive and negative electrodes of each pair of adjacent cells and between the end cells and the terminal plates 28 and 30. The terminal plates are connected to the electrodes of the end cells by conductive masses 18. The extending edge portions 25 of the separator sheets 24 are folded or turned substantially at right angles to the body portions thereof and caused to rest against the lateral surfaces of the stack. Preferably, the said edge portions 25 are turned in the same direction and are sufficiently long that the edge portion of one separator partially overlaps that of the adjacent separator, as is shown in Fig. 1. If desired, the edge portions 25 may be shorter so that adjacent separators do not make contact with each other. The edge portion 25 of each separator 24 covers the exterior surface of the flange of the adjacent zinc tray 10 and forms a complete peripheral encirclement upon the edge surfaces of at least one of the cells 20 and preferably upon more than one as shown in Fig. 1. The edge portion of the last separator toward the right is relatively short as is seen in Figs. 2 and 4, because it is not required to encircle the edge of a cell.

At substantially the same time, the stack is given a preliminary longitudinal compression to bring all of the cell elements into pressure contact with one another. Suitable means for accomplishing this are the compression rods 34 and 36 illustrated in Figs. 4 and 5, which rods are brought respectively into pressure engagement with the opposite ends of the stack and caused to compress the latter to a length somewhat greater than the desired final length thereof. The rods 34 and 36 are bifurcated at their ends to provide recesses 38 and 40 for reasons which will be explained hereinafter.

After the stack has been compressed longitudinally and the extending edge portions 25 of the separators 24 have been turned as described, a strip of thin, flexible, non-conductive heat-fusible, impervious material, which may be similar in composition to the separators 24, is wound transversely about the stack so as to enclose the lateral sides thereof. The strip is of a width slightly greater than the length of the stack and it is wound about the stack several times to form a multiple-layer transverse wrap 44 tightly embracing the lateral sides of the stack and contacting the turned edge portions 25 of the separators 24.

While the stack is so held by the compression rods 34 and 36 and enclosed in the transverse wrap 44 the assembly is subjected to heat and lateral compression to cause the layers thereof to soften and coalesce into a unitary shell and also to cause said transverse wrap to coalesce with the edge portions 25 of the separators 24. This is accomplished by a mold 46 which is made in two substantially U-shaped sections or platens 48 and 50. The platens 48 and 50 are caused to enclose the stack from opposite sides thereof and are of such shape and size as to enclose and fit tightly upon all of the lateral sides of the stack. The mold is heated by the electrical heating coils 52 and 54 and after it is closed upon the stack the softening and coalescing action of the separator edges and the transverse wrap takes place as described heretofore. Also, the end portions of the transverse wrap shrink under the influence of the heat and enclose the margins of the terminal plates 28 and 30 as shown in Fig. 1. In addition to this, the conductive masses 18 upon the positive electrodes 16 and the terminal plate 30 become softened. At this itme the compression rods 34 and 36 are moved together a further amount to bring the stack to the desired final length and cause the softened masses 18 to flow through the openings 26 in the separators 24 and make firm conductive contact between the positive and negative electrodes of adjacent cells and between terminal plates 28 and 30 and the adjacent electrodes of the end cells. It is preferred that the size of the masses 18 is such that the openings 26 are filled with the conductive composition and the latter makes a sealing joint with the edges of the openings 26.

By the heat and compression, the layers of the transverse wrap are fused, or heat-sealed, and coalesced together into a single layer shell, and the shell is similarly fused or heat-sealed to and merged with the turned edge portions 25 of the separators 24 and the overlapping portions of the edge portions 25 are fused and merged together. The result is a unitary, strong, compartmented enclosure or casing in which each cell is contained in a separate sealed compartment, and the electrolyte-containing elements thereof are isolated from those of the other cells. The contacting heat-fusible layers and parts are so closely coalesced and merged together that the result is substantially the same as if the compartmented casing had been initially unitary. While in Fig. 1 the edge portions 25 are shown individually and separated from transverse wrap 44, this is done so that the parts can be seen. In reality the overlapping portions of edge portions 25 are merged together and the said edge portions are merged to the transverse wrap to form an integral casing as described. Fig. 1 illustrates the manner in which the layers of the transverse wrap are merged together, and in connection with a different embodiment Fig. 7 illustrates at the left hand end thereof the way in which the edge portions of the separators are merged together.

The heating and compressing operation described needs to be for only a short period, 10 to 15 seconds being sufficient and a suitable temperature for the platens 48 and 50 is about 375° C. After the heating operation, the platens are moved apart and conductor leads 56 and 58 are connected by soldering or otherwise to the terminal plates 30 and 28 respectively, and adhesive tape 60 is wound longitudinally about the stack to hold the assembly against longitudinal expansion. In this operation, the tape is threaded through the recesses 38 and 40 of the compression rods 34 and 36. The battery is then complete and the compression rods 34 and 36 may be moved apart and the battery removed. If desired, it may be given an additional insulating coating by dipping it in or spraying it with molten wax such as microcrystalline wax or the like.

The embodiment illustrated in Fig. 6 is generally similar to that of Figs. 1 to 5 with the difference that the intercell separators, instead of being individual sheets are in the form of a continuous ribbon which extends in reticulated form. Only a portion of the battery is illustrated, and for clearness the parts are shown spread apart longitudinally of the battery. The cells 120 are similar to the cells 20 described heretofore and have masses of conductive composition 118 applied to the positive electrodes thereof, the tips of said masses being visible in Fig. 6 beyond the edges of the electrolyte-absorbent layers 112. The positive electrode of one cell is separated from the negative electrode of the adjacent cell by a transversely extending section 124 of the elongated ribbon 70 of flexible, non-conductive, heat-softenable material, which may be of the same composition as described heretofore in connection with the separator 24 and transverse wrap 44. Said transverse sections 124 have openings 126 therein exposing the negative electrode of one cell to the positive electrode of the adjacent cell, through which openings said electrodes are connected together by the conductive masses 118. The first section 124 of the reticulated ribbon 70 extends transversely between two cells; the next section 123 extends longitudinally upon the outside of the edge of one of the cells; the next section 124 extends transversely between the last mentioned cell and the next adjacent cell; the next section 123 extends longitudinally upon the outside of the opposite edge of said next adjacent cell, and so on from one end of the battery to the other. For clarity the parts are shown with the cells 120 and transverse sections 124 spaced apart in a direction longitudinally of the battery and the transverse wrap 144 spaced laterally from the surfaces of the stack. In practice the cells are in close, pressure-stacked relation with the sections 124 pressure-sandwiched between adjacent cells. The sections 123, however, are initially spaced away from the edges of the cells, that is, each section 124 is of a length greater than the corresponding dimension of the adjacent cell 120 whereby the end portions extend beyond the edges of the cell. Also, the ribbon 70 is of a width such that the edge portions of the sections 124 extend beyond the edges of the cells. Before the transverse wrap 144 is applied, the projecting end portions and edge portions of the sections 124 are folded so as to lie against the edge surfaces of the cells and cooperate with the longitudinal sections 123 to form peripheral encirclements upon the edges of the cells. The transverse wrap 144 is similar to the transverse wrap 44 of the embodiment of Fig. 1 and is wound tightly about the lateral sides of the stack and the folded projecting end portions and edge portions of sections 124 of the ribbon 70. The longitudinal compression of the stack and the winding, compressing and heating of the transverse wrap 144 are accomplished in the same manner as described heretofore in connection with the embodiment of Fig. 1, whereby the layers of the transverse wrap are coalesced to each other and said wrap is coalesced to the said projecting end portions and edge portions of the transverse sections 124 and also to the longitudinal sections 123 of the ribbon 70 to form a strong unitary casing having a completely enclosed and sealed compartment for each cell. The masses of conductive composition 118 electrically connect the positive and negative electrodes of adjacent cells through the openings 126 in the transverse sections 124 of the separator ribbon 70 in the same manner as described in connection with the conductive masses 18 of the embodiment of Fig. 1.

The embodiment which is shown partially in Fig. 7 is similar to that of Figs. 1 to 5 with the difference that the transverse wrap 44 is omitted and the folded edge portions 25 of the separators 24 themselves form the lateral enclosure for the battery. The construction, proceeding from left to right in Fig. 7, comprises the terminal plate 230 to which is connected the terminal lead 256. The next element is the first separating sheet 224 having its edge portions 225 turned so as to extend longitudinally of the battery and encircle the edge of the adjacent cell. The succeeding elements are the tray-shaped negative electrode 210, the bibulous electrolyte containing element 212, the depolarizing mix 214 and the positive electrode 216, which elements make up the first cell. The next element is the intercell separator 224 and the remainder is a repetition of the series described, to complete the battery. The last element is the terminal plate 228 to which is connected the second battery terminal lead 258. The terminal plates 230 and 228 are connected to the adjacent cell electrodes and the positive and negative electrodes of adjacent cells are connected together through openings in the separators 224 by the small bodies 218 of conductive composition in the same manner as described heretofore in connection with the battery of Figs. 1 to 5. At the left hand portion of Fig. 7 the edge portions 225 are shown merged together as they are in the completed battery, while at the right hand portion of the figure they are shown as they are before the final heating and compressing operation so that their individual relationship can be seen. In this embodiment the edge portions of the last two separators 224 on the right as viewed in Fig. 7 are folded back toward the left. The edge portion of the second from the last separator is folded toward the right and then looped back toward the left as shown at 227, and the entire edge portion of the last separator is folded toward the left as indicated at 229. The assembled battery is held together under compression by the encircling tape 269.

The method of forming the battery is similar to that described in connection with the battery of Figs. 1 to 5 with the exception that the transverse wrap is omitted. The same apparatus as illustrated in Figs. 4 and 5 may be employed. The turned edge portions 225 of the separators 224 are compressed and heat-coalesced together and form an integral lateral enclosure. The extra thickness caused by portions 227 and 229 is compressed so as to provide a substantially uniform flat exterior surface for the battery.

The construction of Figs. 1 to 5 is preferred because it provides increased strength while retaining simplicity and economy.

While only a few embodiments of the battery of the invention have been illustrated and described, it is understood that these are illustrative only and variations therefrom as may occur to those skilled in the art are embraced within the present invention.

What is claimed is:

1. A flat cell battery comprising a plurality of flat cells in stacked relationship, separator means of flexible, non-conductive sheet material having a mid-portion extending between each pair of adjacent cells and having edge portions extending beyond the edges of said cells and folded at an angle to said mid-portion and forming a peripheral encirclement upon the edge surfaces of one of said adjacent cells, and a wrapper of flexible non-conductive initially sheet-form material wound upon itself in overlapped relation and about said stack and snugly laterally encircling said stack of peripherally encircled cells and making contact with said peripheral encirclements, the overlapped portions of said wrapper and the contacting surfaces of said wrapper and said separator means being cemented together in sealing relation to form a casing for said battery having a sealed compartment for each of said cells.

2. A flat cell battery comprising a plurality of flat cells in stacked relationship, each cell having a pair of electrodes forming respectively the opposite exposed broad faces of the cell, separator means of flexible, non-conductive, sheet material having a portion substantially coextensive with and sandwiched between said exposed broad surfaces of the facing electrodes of each pair of adjacent cells and edge portions extending beyond said broad surfaces and folded at an angle to said first mentioned portion and forming a peripheral encirclement upon the edge surfaces of one of said adjacent cells, and a wrapper of flexible non-conductive, initially sheet-form material wound upon itself in overlapped relation and laterally about said stack of peripherally encircled cells and contacting said peripheral encirclements, the overlapped portions of said wrapper and the contacting surfaces of said wrapper and said edge encirclements being cemented together in sealing relationship to form a compartmented casing for said battery having an individual sealed compartment for each of said cells.

3. A battery as claimed in claim 2 in which the separator means are in the form of a continuous ribbon which is folded back and forth with succeeding sections thereof extending between succeeding pairs of adjacent cells.

4. A flat cell battery comprising a plurality of flat cells in stacked relationship, a separator of flexible, non-conductive sheet material having a body portion interposed between each pair of adjacent cells and having extending edge portions folded at an angle to the body portion and forming a peripheral encirclement upon the edge surfaces of one of said adjacent cells, and a wrapper of flexible non-conductive initially sheet-form material wound upon itself in overlapped relation and laterally about said stack of peripherally encircled cells and making contact with said peripheral encirclements, the overlapped portions of said wrapper and the contacting surfaces of said wrapper and said peripheral encirclements being cemented together in sealing relation to form a sealed compartment for each of said cells.

5. A flat cell battery comprising a plurality of flat cells in stacked relationship, each cell having a pair of electrodes forming respectively the opposite exposed broad faces of the cell, a separator of flexible, non-conductive sheet material having a body portion extending between said exposed broad surfaces of the facing electrodes of each pair of adjacent cells and having edge portions extending beyond said broad surfaces and folded at an angle to said body portion and forming a peripheral encirclement upon the edge surfaces of one of said adjacent cells, and a wrapper of flexible, non-conductive, initially sheet-form material wound upon itself in overlapped relation and laterally about said stack of peripherally encircled cells and making contact with said peripheral encirclements, the overlapped portions of said wrapper and the contacting surfaces of said wrapper and said peripheral encirclements being heat-fusible and being heat-coalesced together to form a unitary compartmented casing for said battery having a sealed compartment for each of said cells.

6. A flat cell battery comprising a plurality of flat cells in stacked relationship, each cell having a pair of electrodes forming respectively the opposite exposed broad faces of the cell, a separator of flexible, non-conductive, sheet material having a body portion extending between said exposed broad surfaces of the facing electrodes of each pair of adjacent cells and having edge portions extending beyond said broad surfaces and folded at an angle to said body portion and forming a peripheral encirclement upon the edge surfaces of one of said adjacent cells, the peripheral encirclement of one separator overlapping the peripheral encirclement of the adjacent separator, and a wrapper of flexible, non-conductive, initially sheet-form material wound upon itself in overlapped relation and laterally about said stack of peripherally encircled cells and making contact with said peripheral encirclements, the overlapped portions of said wrapper and the contacting surfaces of said wrapper and said encirclements and the overlapping surfaces of said encirclements being heat-fusible and being heat-sealed together to form a unitary casing having a sealed compartment for each of said cells.

7. A flat cell battery comprising a plurality of flat cells in stacked relationship, each cell having a pair of electrodes forming respectively the opposite exposed broad faces of the cell, a separator of flexible, non-conductive, heat-fusible sheet material having a body portion extending between said exposed broad surfaces of the facing electrodes of each pair of adjacent cells and having edge portions extending beyond said broad surfaces and folded at an angle to said body portion and against the lateral surfaces of said stack to form a peripheral encirclement upon the edge surfaces of one of said adjacent cells, the peripheral encirclement of one separator overlapping the peripheral encirclement of the adjacent separator, the overlapping portions of said peripheral encirclements being heat-coalesced together into a unitary shell snugly encasing said battery and having a sealed compartment for each of said cells.

8. A flat cell battery comprising a plurality of flat cells in stacked relationship, each cell having a pair of electrodes forming respectively the opposite exposed broad faces of the cell, one of the electrodes of each cell being in the form of a shallow pan having the edge portions turned at an angle to the main portion thereof, a separator of flexible, non-conductive sheet material having a main portion substantially coextensive with and sandwiched between said exposed broad surfaces of the facing electrodes of each pair of adjacent cells and edge portions extending beyond said broad surfaces and folded against the edge portions of said pan-shaped electrode, and a wrapper of flexible, non-conductive, initially sheet-form material wound upon itself in overlapped relation and laterally about said stack of cells and said folded edge portions of said separators, the surfaces of said overlapped portions of said wrapper and the surface of said wrapper contacting said folded edge portions being heat-fusible, said heat-fusible surfaces being heat-coalesced together to form a unitary compartmented casing for said battery having a sealed compartment for each of said cells.

9. A flat cell battery comprising a plurality of flat cells in stacked relationship, separator means of flexible, non-conductive, heat-fusible sheet material having a mid-portion located between each pair of adjacent cells and having extending edge portions folded at an angle to said mid-portion and forming a peripheral encirclement upon the edge surfaces of one of said adjacent cells, and a wrapper of initially laminated, flexible, non-conductive, heat-fusible sheet material laterally encircling said stack of peripherally encircled cells and contacting said peripheral encirclements, the laminations of said wrapper being heat-coalesced together and the contacting surfaces of said wrapper and said peripheral encirclements being heat-coalesced together to form a unitary compartmented casing for said battery having a sealed compartment for each of said cells.

10. A flat cell battery comprising a plurality of flat cells in stacked relationship, each cell having a pair of electrodes forming respectively the opposite exposed broad faces of the cell, a separator of flexible, non-conductive, heat-fusible sheet material having a body portion extending between said exposed broad surfaces of the facing electrodes of each pair of adjacent cells and having edge portions extending beyond said broad surfaces and folded at an angle to said body portion and forming a peripheral encirclement upon the edge surfaces of one of said adjacent cells, and a wrapper of initially laminated, non-conductive, heat-fusible sheet material snugly laterally encircling said stack of peripherally encircled cells and making contact with said peripheral encirclements, the laminations of said wrapper being heat-coalesced together and the contacting surfaces of said wrapper and said peripheral encirclements being heat-coalesced together to form a unitary compartmented casing for said battery having a sealed compartment for each of said cells.

11. The method of forming a battery which comprises arranging a plurality of flat cells in a stack with sheet-form separator means of flexible, non-conductive, material between each pair of adjacent cells and having edge portions extending beyond the edges of said cells, folding said extending portions against the lateral surfaces of said stack to form a peripheral encirclement upon the edge surfaces of each of said cells, winding a sheet of flexible, non-conductive, material laterally about said stack with portions of said sheet in overlapping relation to form a transverse wrap about the lateral surfaces of said stack, the contacting surfaces of said separator means and said sheet being heat-fusible, compressing said transverse wrap against the lateral surfaces of said stack and said peripheral encirclements and simultaneously heating said wrap to fuse the overlapping portions of said wrap together and to fuse the surface of said wrap to said peripheral encirclements and thereby form a unitary casing for said battery having a sealed compartment for each of said cells.

12. The method of forming a battery which comprises arranging a plurality of flat cells in a stack with a sheet-form separator of flexible, non-conductive, material between each pair of adjacent cells and having edge portions extending beyond the edges of said cells, folding said extending edge portions against the lateral surfaces of said stack to form a peripheral encirclement upon the edge surfaces of each of said cells, winding a strip of flexible, non-conductive sheet material about the lateral surfaces of said stack to form a multiple layer transverse wrap about said stack, the contacting surfaces of said peripheral encirclements and said transverse wrap being heat-fusible, compressing said transverse wrap against the lateral surfaces of said stack and said encirclements and simultaneously heating said transverse wrap to fuse the layers thereof into a snugly fitting, integral shell and to fuse the surface thereof to said encirclements and thereby form a unitary casing for said battery having a sealed compartment for each of said cells.

13. The method of forming a battery which comprises arranging a plurality of flat cells in a stack with a sheet-form separator of flexible, non-conductive, heat-fusible material between each pair of adjacent cells, said separators having edge portions extending beyond the edges of said cells, folding said extending edge portions in a uniform direction along the lateral surfaces of said stack to form peripheral encirclements upon the edge surfaces of said cells, the encirclement of one separator partially overlapping the encirclement of the adjacent separator, winding a strip of flexible, non-conductive, heat-fusible sheet material about the lateral surfaces of said stack to form a multiple overlapping layer transverse wrap about said stack, compressing said transverse wrap against the lateral surfaces of said stack and said encirclements and simultaneously heating said transverse wrap and said encirclements to fuse the overlapping surfaces of said encirclements together and to fuse the overlapping layers of said wrap together and to fuse together the contacting surfaces of said wrap and said encirclements to form a unitary casing for said battery having a sealed compartment for each of said cells.

14. The method of forming a battery which comprises arranging a plurality of flat cells in a stack with a sheet-form separator of flexible, non-conductive, material between each pair of adjacent cells, said separators having edge portions extending beyond the edges of said cells, folding said extending edge portions in a uniform direction against the lateral surfaces of said stack to form peripheral encirclements upon the edge surfaces of said cells, the encirclement of one separator partially overlapping the encirclement of the adjacent separator, the overlapping surfaces of said encirclements being heat-fusible, and simultaneously heating and compressing said encirclements against the lateral surfaces of said stack to fuse the overlapping surfaces of said encirclements together into a unitary shell forming a casing for said battery having a sealed compartment for each of said cells.

References Cited in the file of this patent

UNITED STATES PATENTS

| Number | Name | Date |
| --- | --- | --- |
| 2,307,761 | Deibel | Jan. 12, 1943 |
| 2,307,766 | Deibel | Jan. 12, 1943 |
| 2,307,767 | Deibel | Jan. 12, 1943 |
| 2,416,576 | Franz et al. | Feb. 25, 1947 |
| 2,436,382 | Deibel | Feb. 24, 1948 |
| 2,463,089 | Deibel | Mar. 1, 1949 |
| 2,478,632 | Lockwood et al. | Aug. 9, 1949 |
| 2,519,053 | Reinhardt | Aug. 15, 1950 |
| 2,564,495 | Mullen | Aug. 14, 1951 |

FOREIGN PATENTS

| Number | Country | Date |
| --- | --- | --- |
| 554,926 | Great Britain | July 26, 1943 |
| 558,207 | Great Britain | Dec. 24, 1943 |
| 118,812 | Australia | Aug. 11, 1944 |
| 617,001 | Great Britain | Jan. 31, 1949 |